(12) United States Patent
Naito et al.

(10) Patent No.: US 7,522,404 B2
(45) Date of Patent: Apr. 21, 2009

(54) SOLID ELECTROLYTIC CAPACITOR AND THE USE THEREOF

(75) Inventors: Kazumi Naito, Chiba (JP); Katutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 268 days.

(21) Appl. No.: 10/592,377

(22) PCT Filed: Mar. 8, 2005

(86) PCT No.: PCT/JP2005/004414

§ 371 (c)(1),
(2), (4) Date: Sep. 11, 2006

(87) PCT Pub. No.: WO2005/086191

PCT Pub. Date: Sep. 15, 2005

(65) Prior Publication Data

US 2007/0206344 A1    Sep. 6, 2007

Related U.S. Application Data

(60) Provisional application No. 60/553,529, filed on Mar. 17, 2004.

(30) Foreign Application Priority Data

Mar. 9, 2004    (JP)    ............................. 2004-065072

(51) Int. Cl.
  *H01G 9/04*    (2006.01)
  *H01G 9/02*    (2006.01)
(52) U.S. Cl. ....................................... 361/532; 361/525
(58) Field of Classification Search ................. 361/523, 361/525, 532, 533

See application file for complete search history.

(56) References Cited

U.S. PATENT DOCUMENTS

| 4,648,010 A | 3/1987 | Naitoh et al. |
| 6,519,135 B2 * | 2/2003 | Sano et al. ................... 361/510 |
| 6,545,858 B1 | 4/2003 | Naito et al. |
| 6,775,127 B2 * | 8/2004 | Yoshida ....................... 361/528 |
| 6,909,596 B2 * | 6/2005 | Shimoyama et al. ........ 361/523 |
| 6,914,770 B1 * | 7/2005 | Goldberger .................. 361/528 |

FOREIGN PATENT DOCUMENTS

| JP | 60-37114 | 2/1985 |
| JP | 6-82592 | 10/1994 |
| JP | 7-66901 | 7/1995 |
| JP | 2001-155963 | 6/2001 |
| JP | 2003-59338 | 2/2003 |
| JP | 2003-115216 | 4/2003 |
| JP | 2003-203828 | 7/2003 |
| WO | WO 02/093596 A1 | 11/2002 |

* cited by examiner

*Primary Examiner*—Eric Thomas
(74) *Attorney, Agent, or Firm*—Sughrue Mion, PLLC

(57) ABSTRACT

The present invention relates to a solid electrolytic capacitor with low ESR obtained by stacking a dielectric layer on a surface of an anode body comprising a valve-acting metal or an electrically conducting oxide, further sequentially stacking a semiconductor layer and an electrically conducting layer on the dielectric layer to prepare a solid electrolytic capacitor element, and molding it with a jacket material, the electrically conducting layer having an electrically conducting paste layer mainly comprising an electrically conducting metal powder and resin, wherein the tap density of the electrically conducting metal powder is 4 g/cm$^3$ or more, and an electronic circuit and an electronic device using the solid electrolytic capacitor.

22 Claims, No Drawings

SOLID ELECTROLYTIC CAPACITOR AND THE USE THEREOF

CROSS-REFERENCE TO RELATED APPLICATIONS

This is an application filed pursuant to 35 U.S.C. Section 111(a) with claiming the benefit of U.S. provisional application Ser. No. 60/553,529 filed Mar. 17, 2004 under the provision of 35 U.S.C. 111(b), pursuant to 35 U.S.C. Section 119(e)(1).

TECHNICAL FIELD

The present invention relates to a solid electrolytic capacitor with low ESR, and use thereof.

BACKGROUND ART

The capacitor utilized for central processing unit (CPU) for personal computers and the like is required to have high capacitance and low ESR (equivalent series resistance) so as to suppress the fluctuation of voltage and reduce the heat generation at the passing of a high ripple current.

Generally, an aluminum or tantalum solid electrolytic capacitor is used.

The solid electrolytic capacitor is produced by stacking a dielectric layer on a surface of an anode body comprising a valve-acting metal or an electrically conducting oxide, further sequentially stacking a semiconductor layer and an electrically conducting layer on the dielectric layer to prepare a solid electrolytic capacitor element, and molding it with a jacket material. As for the shape of the anode body, a metal foil or electrically conducting oxide foil having fine pores in the surface layer and a metal powder or electrically conducting powder sintered body having fine pores in the inside are known. The dielectric layer is formed also on the surface of such a fine pore of the anode body, and the semiconductor layer is stacked also on the dielectric layer within the pore. A solid electrolytic capacitor with low ESR is produced by using an organic or inorganic semiconductor having a high electric conductivity for the semiconductor layer.

Also, studies are being made to produce a solid electrolytic capacitor with low ESR by improving the electrically conducting paste used for forming the electrically conducting layer of the solid electrolytic capacitor. For example, JP-A-2003-059338 (the term "JP-A" as used herein means an "unexamined published Japanese patent application") discloses a composition comprising two components of carbon powder and electrically conducting metal powder and JP-A-2003-203828 discloses an electrically conducting polymer layer for connecting electrically conducting metal particles of the electrically conducting paste layer.

DISCLOSURE OF THE INVENTION

In recent years, there has been rising demand of electric devices for a solid electrolytic capacitor having a lower ESR and allowing an ever-larger current to pass, but it has been difficult to satisfy the demand. Furthermore, the above-described method of producing a solid electrolytic capacitor by using an electrically conducting paste is complicated and a more economical method has been demanded.

As a result of intensive investigations to solve these problems, the present inventors have found that when a metal powder having specific properties is employed for the main component of the metal powder-containing paste layer used as a part of the electrically conducting layer of a solid electrolytic capacitor, the above-described problems can be solved. The present invention has been accomplished based on this finding.

That is, the present invention relates to the following solid electrolytic capacitor and the electronic device using the capacitor.

1. A solid electrolytic capacitor obtained by stacking a dielectric layer on a surface of an anode body comprising a valve-acting metal or an electrically conducting oxide, further sequentially stacking a semiconductor layer and an electrically conducting layer on the dielectric layer to prepare a solid electrolytic capacitor element, and molding it with a jacket material, the electrically conducting layer having an electrically conducting paste layer mainly comprising an electrically conducting metal powder and resin, wherein the tap density of the electrically conducting metal powder is 4 $g/cm^3$ or more.

2. The solid electrolytic capacitor as described in 1 above, wherein the electrically conducting metal powder is at least one member selected from the group consisting of silver, copper, aluminum, nickel, a copper-nickel alloy, a silver alloy, a silver-mixed powder and a coated powder with silver jacket.

3. The solid electrolytic capacitor as described in 1 above, wherein the electrically conducting metal powder is at least one member selected from the group consisting of silver, a silver alloy, a silver-mixed powder and a coated powder with silver jacket.

4. The solid electrolytic capacitor as described in any one of 1 to 3 above, wherein the electrically conducting metal powder has a flat shape.

5. The solid electrolytic capacitor as described in any one of 1 to 3 above, wherein the electrically conducting metal powder is a mixture of powders having a granular or flat shape.

6. The solid electrolytic capacitor as described in any one of 1 to 5 above, wherein the thickness of the electrically conducting paste layer is 10 μm or more.

7. The solid electrolytic capacitor as described in any one of 1 to 6 above, wherein the valve-acting metal or electrically conducting oxide is tantalum, aluminum, niobium, titanium, an alloy mainly comprising such a valve-acting metal, or niobium oxide.

8. The solid electrolytic capacitor as described in any one of 1 to 7 above, wherein the valve-acting metal is a metal foil having etched pores or a metal powder sintered body.

9. The solid electrolytic capacitor as described in any one of 1 to 8 above, wherein the electrically conducting oxide is a sintered body of niobium oxide powder.

10. The solid electrolytic capacitor as described in 1 or 8 above, wherein the valve-acting metal is a sintered body produced from a niobium powder having a CV value of 150,000 μF·V/g or more.

11. The solid electrolytic capacitor as described in 1 or 8 above, wherein the valve-acting metal is a sintered body produced from a tantalum powder having a CV value of 100,000 μF·V/g or more.

12. The solid electrolytic capacitor as described in 1 above, wherein the dielectric layer mainly comprises at least one member selected from metal oxides as $Al_2O_3$, $Ta_2O_5$, $TiO_2$ and $Nb_2O_5$.

13. The solid electrolytic capacitor as described in 1 above, wherein the semiconductor layer is at least one member selected from an organic semiconductor layer and an inorganic semiconductor layer.

14. The solid electrolytic capacitor as described in 13 above, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

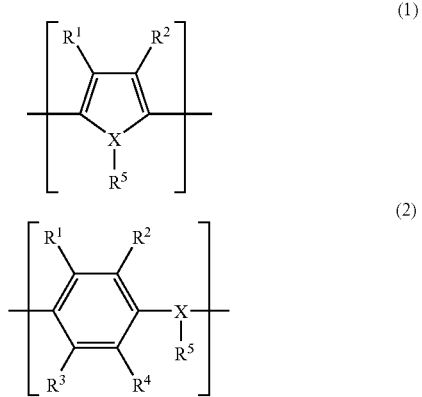

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

15. The solid electrolytic capacitor as described in 14 above, wherein the polymer containing a repeating unit represented by formula (I) is a polymer containing, as a repeating unit, a structure unit represented by the following formula (3):

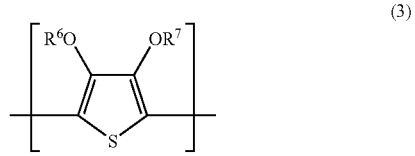

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

16. The solid electrolytic capacitor as described in 14 above, wherein the polymer is selected from polyaniline, polyoxyphenylene, polyphenylene sulfide, polythiophene, polyfuran, polypyrrole, polymethylpyrrole, and substitution derivatives and copolymers thereof.

17. The solid electrolytic capacitor as described in 16 above, wherein the polymer is poly(3,4-ethylenedioxythiophene).

18. The solid electrolytic capacitor as described in 13 above, wherein the inorganic semiconductor is at least one compound selected from molybdenum dioxide, tungsten dioxide, lead dioxide and manganese dioxide.

19. The solid electrolytic capacitor as described in 13 above, wherein the electric conductivity of the semiconductor is from $10^{-2}$ to $10^3$ S/cm.

20. An electronic circuit using the solid electrolytic capacitor described in any one of 1 to 19 above.

21. An electronic device using the solid electrolytic capacitor described in any one of 1 to 19 above.

One embodiment of the solid electrolytic capacitor of the present invention is described below.

The valve-acting metal and electrically conducting oxide used for the anode body of the solid electrolytic capacitor of the present invention includes, for example, aluminum, tantalum, niobium, titanium, an alloy mainly comprising such a valve-acting metal, niobium oxide and a mixture of two or more members selected from these valve-acting metals, alloys and electrically conducting oxide. When a valve-acting metal is used as the anode body, the metal may be used after subjecting a part thereof to at least one treatment selected from carbidation, phosphation, boronation, nitridation and sulfidation. The anode body is not particularly limited in its shape and may have a foil-, plate- or bar-like shape, but an etched foil having fine pores in the surface layer or a sintered body having fine pores in the inside produced from a powder material is preferred because the surface area is large and the capacitance of the capacitor produced thereof increases.

When the method of the present invention is applied to an anode body which is difficult to be impregnated with the semiconductor, for example, an anode body having fine and deep pores, this can effectively compensate for increase in ESR of the capacitor due to increase of contact resistance between semiconductors. For example, as for the anode body in the form of a sintered body, the method of the present invention is effective when applied to an anode body having a size of 5 mm$^3$ or more and having a CV value (product of capacitance and forming voltage when measured with an electrolytic solution) of 100,000 µF·V/g or more in the case of a sintered body of a tantalum metal powder material or having a CV value of 150,000 µF·V/g or more in the case of a sintered body of a niobium metal powder material. As for the anode body in the form of an etched foil, the present method is effective when applied to an anode body having a CV value of 1,000 µF·V/cm$^2$ or more and an etched pore depth of 50 µm or more.

Also, in the case of shaping and then sintering a powdery valve-acting metal or electrically conducting oxide, it is possible to directly connect an outgoing lead to the anode body. Also, a part of a separately prepared outgoing lead (lead wire or lead foil) may be shaped together with the powder at the shaping and the outgoing lead outside the shaped portion may be used as the outgoing lead of one electrode of the capacitor. In the case of a foil-, plate- or bar-like anode body, a part thereof may be used as an anode part where a semiconductor layer and an electrically conducting layer, which are described later, are not formed. The dielectric layer may be present on a part or the whole of the outgoing lead and on a part or the whole of the anode part. When an insulating resin is coated and dried on the contact part between the outgoing lead and the anode body and on the boundary between the anode part and the remaining part, or an insulating material is fixed to these parts, it can prevent the semiconductor layer or electrically conducting layer from adhering to the outgoing lead or anode part, which is preferable.

The dielectric layer formed on the surface (when pores are present in the inside, including the pore surface) of the anode body of the present invention includes a dielectric layer mainly comprising at least one member selected from metal oxides such as $Al_2O_3$, $Ta_2O_5$, $TiO_2$ and $Nb_2O_5$. This dielectric layer can be obtained by electrochemically forming the above-described anode body in an electrolytic solution containing at least one member selected from mineral acids, organic acids and salts thereof.

The semiconductor layer formed on the dielectric layer of the present invention includes at least one compound selected from organic semiconductors and inorganic semiconductors.

Specific examples of the organic semiconductors include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

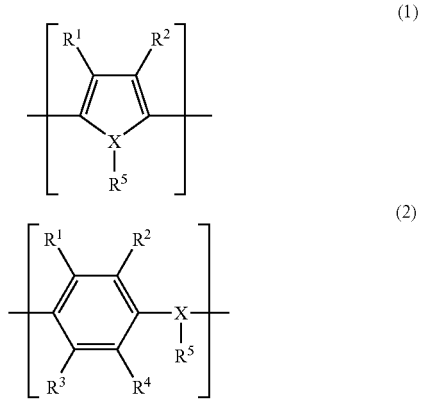

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

The electrically conducting polymer containing a repeating unit represented by formula (I) in the present invention is preferably an electrically conducting polymer containing, as a repeating unit, a structure unit represented by the following formula (3):

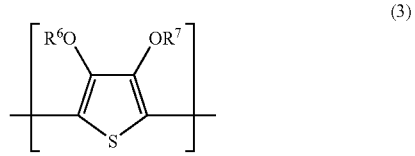

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position. The cyclic structure includes a structure having a vinylene bond which may be substituted, and a phenylene structure which may be substituted.

The electrically conducting polymer containing such a chemical structure is being electrically charged and a dopant is doped thereto. As for the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductors include at least one compound selected from molybdenum dioxide, tungsten dioxide, lead dioxide and manganese dioxide.

When the organic or inorganic semiconductor used has an electric conductivity of $10^{-2}$ to $10^3$ S/cm, the capacitor produced can have a small ESR value and this is preferred.

The semiconductor layer can be formed by employing one or more conventionally known methods such as a method using electrolytic polymerization described in JP-A-60-37114, a method using electrolytic polymerization of an anode substrate treated with an oxidizing agent described in Japanese Patent No. 2,054,506, and a method using chemical deposition described in Japanese Patent No. 2,044,334. Also, a re-electrochemical forming operation may be performed on the way of and/or after the formation of the semiconductor layer so as to repair fine defects of the oxide dielectric film layer, which are generated at the formation of the semiconductor layer.

In the present invention, an electrically conducting layer is provided on the semiconductor layer formed by the above-described method or the like.

The electrically conducting layer can be formed, for example, by solidification of an electrically conducting paste such as silver paste, copper paste, aluminum paste, carbon paste and nickel paste, plating such as nickel plating, copper plating, silver plating, aluminum plating and gold plating, vapor deposition of a metal such as aluminum, nickel, copper, silver and gold, or lamination of a heat-resistant electrically conducting resin film.

Examples of the electrically conducting metal powder which can be used in the present invention include silver, copper, aluminum, nickel, a copper-nickel alloy, a silver alloy, a silver-mixed powder and a coated powder with silver jacket. Among these, preferred are an alloy (e.g., copper, nickel, palladium) mainly comprising silver, a mixed powder mainly comprising silver (e.g., silver with copper, nickel and/or palladium), and a coated powder with silver jacket (obtained by coating silver on a powder of copper, nickel or the like). It is important that at least one electrically conducting layer is an electrically conducting paste layer mainly comprising a resin and an electrically conducting metal powder having a tap density of 4.0 g/cm³ or more, preferably from 4.0 to 6.0 g/cm³, more preferably from 4.5 to 6.0 g/cm³. As for the electrically conducting metal powder, silver is particularly preferable.

The case of using a silver powder is described in detail below.

When the tap density of the silver powder is 4.0 g/cm³ or more, the silver paste produced thereof exhibits good depositing property after solidification and in turn, the ESR value of the solid electrolytic capacitor produced decreases. The tap density of the silver powder can be adjusted, for example, with use of a stamp mill after adding a stearic acid to a granular silver powder produced according to a reduction process.

The silver paste layer as the electrically conducting layer of a solid electrolytic capacitor is usually a very thin layer of 1 to 100 μm and for maintaining electrical conductivity in such a thin layer, the depositing manner of silver powder in the silver paste is an important factor, but in the present invention, by using a silver powder having a predetermined tap density value or more, good deposition can be expected.

There is no correlation between the electrical conductivity of the silver paste itself with the tap density of the silver powder, but when the silver paste is used as the electrically conducting layer of a solid electrolytic capacitor, the object of the present invention can be achieved by using a silver powder having a specific tap density as mentioned above.

In the present invention, when the tap density of the silver powder is 4.0 g/cm$^3$ or more and the silver powder has a flat shape, the depositing manner can be more enhanced and the electrical conductivity in the direction perpendicular to the axis of overlapped flat powders can also be enhanced.

In the present invention, the upper limit of the tap density of the silver powder is preferably 6.0 g/cm$^3$, because when a silver paste is produced by using a silver powder having a tap density exceeding 6.0 g/cm$^3$, the silver powder is readily broken at the time of stirring the silver paste and this is not preferred.

Furthermore, when the tap density of the silver powder is 4.0 g/cm$^3$ or more and a mixture of a flat powder and a granular powder produced, for example, by reducing a silver-containing compound is used as the silver powder, the electrical conductivity in the axis direction of overlapped flat powders is advantageously also enhanced.

Usually, preferred electrical conductivity is exerted when the ratio of granular powder to flat powder used is from 5 to 20 mass %, preferably from 5 to 15 mass %. Also, in the case of using a flat powder and a granular powder by mixing these powders, the granular powder is preferably adjusted to fill the gap generated between flat powders. The aspect ratio (ratio between long side and short side) of a flat silver powder can be determined as an average aspect ratio from a photograph taken at 2,000 times through an electron microscope. The aspect ratio of the flat silver powder is preferably 1.2 or more. By taking account of relationship with this flat silver powder, preferred particle size and amount blended of the granular powder can be determined.

As described above, the silver paste layer is a very thin layer and when the silver paste layer of the present invention is formed to have a thickness of 10 μm or more, preferably 30 μm or more, the solid electrolytic capacitor produced can be more enhanced with respect to the ESR value and this is preferred. The upper limit of the thickness of the silver paste layer is not particularly limited, but for avoiding enlargement of the capacitor shape, the thickness is preferably 100 μm or less, more preferably 70 μm or less.

Examples of the resin used together with the silver powder include alkyd resin, acryl resin, epoxy resin, phenol resin, imide resin, fluoro resin, ester resin, imideamide resin, amide resin, styrene resin and urethane resin, but other known resins may also be used. Among these, preferred are acryl resin, epoxy resin and fluororesin. A plurality of various resins may also be used.

In the silver paste, in addition to the main components of resin and silver powder, depending on the case, a solvent for dissolving the resin, a hardening agent for the resin, and a dispersant for the silver powder, such as titanium coupling agent and silane coupling agent, are added. The silver paste as the electrically conducting layer is finally left standing in air or heated to effect solidification and at this time, the solvent is dissipated.

The silver powder content in the silver paste is usually from 40 to 97 mass %. If the silver powder content is less than 40 mass %, the electrical conductivity of the silver paste produced disadvantageously becomes low, whereas if it exceeds 97 mass %, the silver paste may undergo adhesion failure and this is not preferred. In the silver paste, the above-described electrically conducting polymer or metal oxide powder for forming the semiconductor layer may be mixed and used.

Specific examples of the electrically conducting layer of the present invention include an electrically conducting layer obtained by sequentially stacking a carbon paste and a silver paste.

By stacking layers up to the electrically conducting layer, a solid electrolytic capacitor element is produced.

The solid electrolytic capacitor element of the present invention having such a constitution is jacketed, for example, by resin mold, a resin case, a metallic jacket case, resin dipping or a laminate film and thereby can be completed as a solid electrolytic capacitor product for various uses. Among these, a chip solid electrolytic capacitor jacketed by resin mold is preferred, because reduction in the size and cost can be simply achieved.

The case of employing resin mold jacketing is specifically described.

A part of the electrically conducting layer of the capacitor element obtained as above is laid on one end part of a separately prepared lead frame having a pair of oppositely disposed end parts, and a part of the anode body (the anode lead in the case of an anode body having an anode lead in this case, in order to adjust the dimension, the anode lead may be used after cutting the distal end thereof) is laid on the other end part of the lead frame. After electrically or mechanically connecting the parts respectively, for example, by solidification of an electrically conducting paste for the former and by welding for the latter, the entirety is molded with a resin while leaving outside a part of each end part of the lead frame, and the lead frame is cut and bent at predetermined portions outside the resin molding (when the lead frame is present on the bottom surface of resin molding and the entirety is molded while leaving outside only the bottom surface or the bottom and side surfaces of the lead, the lead frame may be only cut), whereby the capacitor of the present invention is produced. The lead frame is cut as described above and finally works out to an external terminal of the capacitor. The lead frame has a foil or tabular shape and the material used therefor is iron, copper, aluminum or an alloy mainly comprising such a metal. The lead frame may be partially or entirely plated with solder, tin, titanium, gold, silver or the like. Between the lead frame and the plating, primer plating such as nickel and copper may be provided.

After or before the above-described cutting and bending work, the lead frame may be plated with these various metals or alloys. It is also possible to plate the lead frame before mounting and connecting the solid electrolytic capacitor element thereon and again plate it at an arbitrary time after molding.

In the lead frame, a pair of oppositely disposed end parts are present with a gap therebetween, and by virtue of the presence of the gap, the anode part and the electrically conducting layer part of each solid electrolytic capacitor element are insulated from each other.

As for the kind of the resin used for resin mold jacketing, a known resin for use in molding a solid electrolytic capacitor, such as epoxy resin, phenol resin and alkyd resin, can be employed, but in each resin case, using low-stress resin generally available on the market is preferable because the molding stress imposed on the solid electrolytic capacitor element, which is generated at the molding, can be mitigated. The production machine for performing the resin molding is preferably a transfer machine.

The thus-produced solid electrolytic capacitor may be subjected to an aging treatment so as to repair the thermal and/or physical deterioration of the dielectric layer, which is caused at the formation of an electrically conducting layer or at the jacketing.

The aging is performed by applying a predetermined voltage (usually, within 2 times the rated voltage) to the solid electrolytic capacitor. The optimal values of aging time and temperature vary depending on the kind and capacitance of a capacitor and the rated voltage and are determined by previously performing an experiment, but the aging time is usually from several minutes to several days and the aging temperature is usually 300° C. or less by taking account of thermal deterioration of the voltage-applying jig. The aging atmosphere may be an atmosphere of air or gas such as argon, nitrogen and helium. Also, the aging may be performed in any one condition of reduced pressure, atmospheric pressure and applied pressure, but when the aging is performed while or after supplying water vapor, stabilization of the dielectric layer sometimes proceeds. The aging may also be performed after supplying water vapor and then allowing the solid electrolytic capacitor to stand at a high temperature of 150 to 250° C. for several minutes to several hours to remove excess water content. Examples of the method for supplying the water vapor include a method of supplying water vapor from a water reservoir placed in the aging furnace by using the heat.

As for the method of applying a voltage, an arbitrary current such as direct current, alternating current (having an arbitrary waveform), alternating current superposed on direct current, and pulse current can be designed to pass. It is also possible to once stop applying a voltage during aging and again apply a voltage.

The solid electrolytic capacitor produced in the present invention can be preferably used, for example, for circuits using a high-capacitance capacitor, such as central processing circuit and power source circuit. These circuits can be used in various digital devices such as a personal computer, server, camera, game machine, DVD equipment, AV equipment and cellular phone, and electronic devices such as various power sources. The solid electrolytic capacitor produced in the present invention has high capacitance and good ESR performance and therefore, by using this solid electrolytic capacitor, electronic circuits and electronic devices having good high-speed responsibility can be obtained.

BEST MODE FOR CARRYING OUT THE INVENTION

The present invention is described in greater detail below by referring to specific examples thereof, but the present invention is not limited to these Examples.

With respect to each of the capacitors produced in Examples below, the tap density of the silver powder used, the average thickness of the silver paste layer, the capacitance, and the ESR value were measured by the following methods.

Tap Density:
A tapping machine KRS-409 manufactured by Kuramochi Kagaku Kiki Seisakusho was used. The tap density was determined by charging 100 g of silver powder into a 150-mL graduated glass cylinder, vertically vibrating the glass cylinder 100 times to a height of 20 mm at a speed of 30 times/min and then measuring the volume.

Average Thickness of Silver Paste Layer:
A photograph of the cross-section parallel to the short-axis direction of the sintered body was taken at a magnification of 1,000 times through an electron microscope and the numerical value of the most frequently appearing part was employed.

Capacitance:
The capacitance was measured at room temperature and 120 Hz by using an LCR measuring meter manufactured by Hewlett Packard, Ltd.

ESR:
The equivalent series resistance of the capacitor was measured at 100 kHz.

The granular silver powder used in the present invention was obtained by reducing an aqueous silver nitrate solution with use of hydrazine and $NaBH_4$. After adding stearic acid, the reduced powder was made into a flat shape by a stamp mill to obtain the flat silver powder. Each silver powder produced had a specific surface area of 0.1 to 20 $m^2/g$ and an average particle size of 0.4 to 20 μm.

EXAMPLES 1 TO 6 AND COMPARATIVE EXAMPLES 1 TO 3

A niobium primary powder (average particle size: 0.4 μm) ground by utilizing hydrogen embrittlement of a niobium ingot was granulated to obtain a niobium powder having an average particle size of 100 μm (since this was fine powder, naturally oxidized to contain 85,000 ppm of oxygen). This niobium powder was left standing in a nitrogen atmosphere at 500° C. and further in Ar at 700° C. to obtain a partially nitrided niobium powder (CV: 203,000 (μF·V/g) having a nitrided amount of 11,000 ppm. The resulting niobium powder was shaped together with a niobium wire of 0.37 mmφ and the shaped article was sintered at 1,280° C. In this way, a plurality of sintered bodies (anode bodies) having a size of 4.0×3.5×1.7 mm (mass: 0.08 g; the niobium wire served as a lead wire and was present by 3.7 mm to the inside of the sintered body and by 8 mm outside) were produced. Thereafter, the sintered body was electrochemically formed in an aqueous 0.1% phosphoric acid solution for 7 hours at 80° C. and 20 V to form a dielectric layer mainly comprising niobium oxide on the sintered body surface and on a part of the lead wire. Subsequently, the sintered body was dipped in an aqueous 2% ammonium persulfate solution, dried to remove water and then electrolytically polymerized for 60 minutes in a separately prepared aqueous solution having dissolved therein an ethylenedioxythiophene monomer and an anthraquinonesulfonic acid. After pulling it out from the aqueous solution, the sintered body was washed with alcohol, washed with water, dried and then subjected to re-electrochemical formation in an aqueous 1% phosphoric acid solution for 15 minutes at 80° C. and 14 V. This operation of electrolytic polymerization and re-electrochemical formation of the sintered body was repeated 20 times to form a semiconductor layer on the dielectric layer. On this semiconductor layer, a carbon paste layer was stacked and dried and then the silver paste shown in Table 1 was stacked and dried to form an electrically conducting layer. In this way, a plurality of solid electrolytic capacitor elements were produced. The average aspect ratio of the flat silver powder determined from a photograph taken at a magnification of 2,000 times through an electron microscope was 1.2 or more. On a pair of end parts of a separately prepared lead frame serving as an external electrode, the lead wire on the anode side and the silver paste surface on the cathode side were placed and electrically or mechanically connected, respectively, by spot-welding for the former and by the same silver paste shown in each Example of Table 1 for the latter. Thereafter, the entirety excluding a part of the lead flame was transfer-molded with epoxy resin and the lead frame outside the mold was cut at a predetermined position and then bent along the jacket to serve as an external terminal. In this way, a plurality of chip solid electrolytic capacitors in a size of 7.3×4.3×2.8 mm were produced.

Subsequently, the capacitor was left standing in a constant humidity chamber at 60° C. and 90% RH for 24 hours, then aged at 125° C. and 7 V for 3 hours and further left standing in a drier at 185° C. for 15 minutes, thereby completing a final chip solid electrolytic capacitor.

EXAMPLES 7 TO 12 AND COMPARATIVE EXAMPLES 4 TO 6

By using a tantalum powder having CV (product of capacitance and electrochemical voltage) of 150,000 μF·V/g, a sintered body in a size of 4.5×0.95×3.1 mm was produced in the same manner as in Example 1 (sintering temperature: 1,300° C., sintering time: 20 minutes, density of sintered body: 6.1 g/cm$^3$, tantalum lead wire: 0.24 mmφ; the tantalum lead wire was partially embedded in parallel to the longitudinal direction of the 4.5 mm dimension of the sintered body and the lead wire protruded from the sintered body served as the anode part). The sintered body serving as an anode was dipped in an aqueous phosphoric acid solution excluding a part of the lead wire and electrochemically formed at 80° C. for 8 hours by applying 9 V between the anode and the tantalum plate electrode as the cathode to form an oxide dielectric film layer comprising Ta$_2$O$_5$. An operation of dipping this sintered body excluding the lead wire in a 1:1 mixed solution of an aqueous 20% lead acetate solution and an aqueous 35% ammonium persulfate solution, allowing it to stand at 40° C. for 1 hour, pulling up, water-washing and drying the sintered body, and further dipping it in an aqueous 15% ammonium acetate solution, then pulling up, water-washing and drying it, was repeated 39 times to form a semiconductor layer comprising a mixture of lead dioxide and lead acetate (lead dioxide: 96%) on the oxide dielectric film layer. On this semiconductor layer, a carbon paste was stacked and dried and further the silver paste shown in Table 1 was stacked and dried to produce a solid electrolytic capacitor element. Subsequently, a plurality of chip solid electrolytic capacitors in a size of 7.3×4.3× 1.8 mm were produced in the same manner as in Example 1.

EXAMPLES 13 TO 16

A plurality of chip solid electrolytic capacitors were produced in the same manner as in Example 3 except that the niobium sintered body of Example 3 was replaced by a niobium monoxide sintered body (sintering temperature: 1,4800° C., CV: 180,000 μF·V/g, mass: 0.065 g) produced by sintering a niobium monoxide powder having an average particle size of 120 μm resulting from granulating a niobium monoxide powder (particle size: 0.5 μm) obtained by reducing diniobium pentoxide, and the attaching amount of silver paste was varied to sequentially change the thickness of the silver paste layer.

EXAMPLE 17 AND COMPARATIVE EXAMPLE 7

Production of Silver-Coated Nickel Powder

To each of two kinds of nickel powders (average particle size in Example 17: 5 μm, average particle size in Comparative Example 7: 2 μm) produced by Kojundo Chemical Lab. Co., Ltd., 0.3 mass % of a stearic acid was added. Thereafter, the powder particles were made flat by grinding it in a stamp mill to obtain a flat nickel powder having an average particle size of 7 μm (Example 17) or 3 μm (Comparative Example 7). From each flat powder, a silver-coated nickel powder (in both cases, the coat layer thickness was 0.6 μm on average) was produced by using an electroless silver plating solution ESDIA AG-10 produced by Sasaki K.K.

[Production of Silver-Coated Nickel Paste]

A paste was produced from 95 mass % of each of the two kinds of silver-coated nickel powders produced above and 5 mass % of polymethyl methacrylate resin produced by Aldrich by using butyl acetate as a solvent.

[Production of Solid Electrolytic Capacitor]

After stacking the silver-coated nickel paste on a solid electrolytic capacitor element produced in the same manner as in Example 1 where layers up to the carbon paste layer were formed, two kinds (Example 17 and Comparative Example 7) of a plurality of chip solid electrolytic capacitors were produced in the same manner as in Example 1.

The tap density and shape of the metal powder, the composition of the metal paste and the measured average particle size of the powder used in Examples 1 to 17 and Comparative Examples 1 to 7 are shown together in Table 1. Also, the average thickness of the metal paste layer in each Example (four units were measured) and the average capacitance and ESR of 30 units in each Example were measured and the measured values are shown together in Table 2.

TABLE 1

|  |  | Tap Density (g/cm$^3$) | Shape of Metal Powder | Composition of Metal Paste | Average Particle Size of Powder Used (μm) |
| --- | --- | --- | --- | --- | --- |
| Examples | 1 | 5.7 | flat | silver: 94 mass %, acryl resin: 6 mass % | 18 |
|  | 2 | 5.3 | flat | silver: 94 mass %, acryl resin: 6 mass % | 11 |
|  | 3 | 4.8 | flat | silver: 94 mass %, acryl resin: 6 mass % | 7 |
|  | 4 | 4.5 | flat: 9 parts, granular: 1 part | silver: 94 mass %, acryl resin: 6 mass % | 2 |
|  | 5 | 4.3 | flat: 8 parts, granular: 2 parts | silver: 94 mass %, acryl resin: 6 mass % | 0.6 |
|  | 6 | 4.0 | flat | silver: 94 mass %, acryl resin: 6 mass % | 5 |
|  | 7 | 5.6 | flat | silver: 91 mass %, epoxy resin: 9 mass % | 17 |

TABLE 1-continued

| | | Tap Density (g/cm³) | Shape of Metal Powder | Composition of Metal Paste | Average Particle Size of Powder Used (μm) |
|---|---|---|---|---|---|
| | 8 | 5.4 | flat | silver: 91 mass %, epoxy resin: 9 mass % | 11 |
| | 9 | 4.9 | flat | silver: 91 mass %, epoxy resin: 9 mass % | 6 |
| | 10 | 4.5 | flat: 9 parts, granular: 1 part | silver: 91 mass %, epoxy resin: 9 mass % | 0.4 |
| | 11 | 4.2 | flat | silver: 91 mass %, epoxy resin: 9 mass % | 2 |
| | 12 | 4.0 | flat | silver: 91 mass %, epoxy resin: 9 mass % | 0.9 |
| | 13 | 4.8 | flat | silver: 94 mass %, acryl resin: 6 mass % | 8 |
| | 14 | 4.8 | flat | silver: 94 mass %, acryl resin: 6 mass % | 8 |
| | 15 | 4.8 | flat | silver: 94 mass %, acryl resin: 6 mass % | 8 |
| | 16 | 4.8 | flat | silver: 94 mass %, acryl resin: 6 mass % | 8 |
| | 17 | 4.8 | flat | silver-coated nickel powder: 95 mass %, acryl resin: 5 mass % | 7.6 |
| Comparative Examples | 1 | 3.8 | flat | silver: 94 mass %, acryl resin: 6 mass % | 4 |
| | 2 | 3.1 | flat | silver: 94 mass %, acryl resin: 6 mass % | 1 |
| | 3 | 2.8 | flat | silver: 94 mass %, acryl resin: 6 mass % | 5 |
| | 4 | 3.7 | flat | silver: 91 mass %, epoxy resin: 9 mass % | 6 |
| | 5 | 3.2 | flat | silver: 91 mass %, epoxy resin: 9 mass % | 3 |
| | 6 | 2.4 | flat | silver: 91 mass %, epoxy resin: 9 mass % | 0.8 |
| | 7 | 3.3 | flat | silver-coated nickel powder: 95 mass %, acryl resin: 5 mass % | 3.6 |

Resin used: Acryl resin (obtained by dissolving polymethyl methacrylate produced by Aldrich Co. in butyl acetate)
Epoxy resin (CE-31, produced by Nippon Pelnox Corporation

TABLE 2

| | | Thickness of Metal Paste Layer (μm) | Capacitance (μF) | ESR (mΩ) |
|---|---|---|---|---|
| Examples | 1 | 31 | 609 | 20 |
| | 2 | 30 | 611 | 21 |
| | 3 | 33 | 605 | 21 |
| | 4 | 31 | 610 | 21 |
| | 5 | 34 | 606 | 21 |
| | 6 | 33 | 608 | 23 |
| | 7 | 28 | 1018 | 14 |
| | 8 | 29 | 1024 | 15 |
| | 9 | 29 | 1020 | 15 |
| | 10 | 33 | 1016 | 15 |
| | 11 | 30 | 1020 | 18 |
| | 12 | 30 | 1021 | 22 |
| | 13 | 8 | 450 | 24 |
| | 14 | 12 | 452 | 22 |
| | 15 | 39 | 451 | 21 |
| | 16 | 60 | 450 | 21 |
| | 17 | 37 | 602 | 25 |
| Comparative Examples | 1 | 30 | 607 | 28 |
| | 2 | 31 | 608 | 29 |
| | 3 | 32 | 610 | 30 |
| | 4 | 29 | 1018 | 26 |
| | 5 | 32 | 1020 | 27 |
| | 6 | 30 | 1017 | 27 |
| | 7 | 36 | 600 | 33 |

As seen from comparison of Examples 1 to 6 and 13 to 16 with Comparative Examples 1 to 3, comparison of Examples 7 to 12 with Comparative Examples 4 to 6 and comparison of Example 17 with Comparative Example 7, when a metal powder having a specific tap density is used for the main component of the metal paste layer used as a part of the electrically conducting layer of a solid electrolytic capacitor, a solid electrolytic capacitor having lower ESR can be produced.

INDUSTRIAL APPLICABILITY

The present invention provides a solid electrolytic capacitor characterized in that a paste layer containing an electrically conducting metal powder, particularly silver powder, having a tap density of 4.0 g/cm³ or more is used for the electrically conducting layer. According to the present invention, a solid electrolytic capacitor having lower ESR can be produced.

The invention claimed is:

1. A solid electrolytic capacitor obtained by stacking a dielectric layer on a surface of an anode body comprising a valve-acting metal or an electrically conducting oxide, further sequentially stacking a semiconductor layer and an electrically conducting layer on the dielectric layer to prepare a solid electrolytic capacitor element, and molding it with a jacket material, the electrically conducting layer having an electrically conducting paste layer mainly comprising an electrically conducting metal powder and resin, wherein the tap density of the electrically conducting metal powder is 4 g/cm³ or more.

2. The solid electrolytic capacitor as claimed in claim 1, wherein the electrically conducting metal powder is at least one member selected from the group consisting of silver, copper, aluminum, nickel, a copper-nickel alloy, a silver alloy, a silver-mixed powder and a coated powder with silver jacket.

3. The solid electrolytic capacitor as claimed in claim 1, wherein the electrically conducting metal powder is at least one member selected from the group consisting of silver, a silver alloy, a silver-mixed powder and a coated powder with silver jacket.

4. The solid electrolytic capacitor as claimed in claim 1, wherein the electrically conducting metal powder has a flat shape.

5. The solid electrolytic capacitor as claimed in claim 1, wherein the electrically conducting metal powder is a mixture of powders having a granular or flat shape.

6. The solid electrolytic capacitor as claimed in claim 1, wherein the thickness of the electrically conducting paste layer is 10 μm or more.

7. The solid electrolytic capacitor as claimed in claim 1, wherein the valve-acting metal or electrically conducting oxide is tantalum, aluminum, niobium, titanium, an alloy mainly comprising such a valve-acting metal, or niobium oxide.

8. The solid electrolytic capacitor as claimed in claim 1, wherein the valve-acting metal is a metal foil having etched pores or a metal powder sintered body.

9. The solid electrolytic capacitor as claimed in claim 1, wherein the electrically conducting oxide is a sintered body of niobium oxide powder.

10. The solid electrolytic capacitor as claimed in claim 1, wherein the valve-acting metal is a sintered body produced from a niobium powder having a CV value of 150,000 μ·V/g or more.

11. The solid electrolytic capacitor as claimed in claim 1, wherein the valve-acting metal is a sintered body produced from a tantalum powder having a CV value of 100,000 μ·V/g or more.

12. The solid electrolytic capacitor as claimed in claim 1, wherein the dielectric layer mainly comprises at least one member selected from metal oxides as $Al_2O_3$, $Ta_2O_5$, $TiO_2$ and $Nb_2O_5$.

13. The solid electrolytic capacitor as claimed in claim 1, wherein the semiconductor layer is at least one member selected from an organic semiconductor layer and an inorganic semiconductor layer.

14. The solid electrolytic capacitor as claimed in claim 13, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

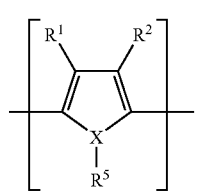

(1)

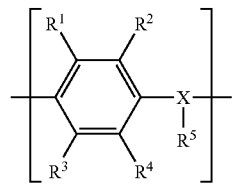

(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

15. The solid electrolytic capacitor as claimed in claim 14, wherein the polymer containing a repeating unit represented by formula (I) is a polymer containing, as a repeating unit, a structure unit represented by the following formula (3):

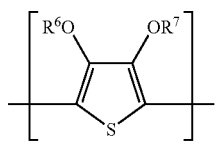

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

16. The solid electrolytic capacitor as claimed in claim 14, wherein the polymer is selected from polyaniline, polyoxyphenylene, polyphenylene sulfide, polythiophene, polyfuran, polypyrrole, polymethylpyrrole, and substitution derivatives and copolymers thereof.

17. The solid electrolytic capacitor as claimed in claim 16, wherein the polymer is poly(3,4-ethylenedioxythiophene).

18. The solid electrolytic capacitor as claimed in claim 13, wherein the inorganic semiconductor is at least one compound selected from molybdenum dioxide, tungsten dioxide, lead dioxide and manganese dioxide.

19. The solid electrolytic capacitor as claimed in claim 13, wherein the electric conductivity of the semiconductor is from $10^{-2}$ to $10^3$·S/cm.

20. An electronic circuit using the solid electrolytic capacitor claimed in claim 1.

21. An electronic device using the solid electrolytic capacitor claimed in claim 1.

22. The solid electrolytic capacitor as claimed in claim 1, wherein the resin is an epoxy resin.

* * * * *